United States Patent [19]

Tuckey

[11] Patent Number: 4,500,270

[45] Date of Patent: Feb. 19, 1985

[54] GEAR ROTOR FUEL PUMP

[75] Inventor: Charles H. Tuckey, Cass City, Mich.

[73] Assignee: Walbro Corporation, Cass City, Mich.

[21] Appl. No.: 403,097

[22] Filed: Jul. 29, 1982

[51] Int. Cl.³ .................... F04B 23/14; F04B 17/00
[52] U.S. Cl. .................... 418/133; 418/135; 418/108; 418/166; 418/171
[58] Field of Search ............ 417/205; 418/133, 135, 418/166, 171, 108, 133

[56] References Cited

U.S. PATENT DOCUMENTS

| 1,584,207 | 5/1926 | Bell | 418/108 |
|---|---|---|---|
| 1,722,616 | 7/1929 | Williams | 418/108 |
| 2,380,783 | 7/1945 | Painter | |
| 2,383,153 | 8/1945 | Parsons | |
| 2,460,047 | 1/1949 | Von Wangenheim | 418/108 |
| 2,650,544 | 9/1953 | Parsons | 418/133 |
| 2,787,963 | 4/1957 | Dolan et al. | 418/133 |
| 2,792,788 | 5/1957 | Eames | 418/108 |
| 3,299,824 | 1/1967 | Gauthier | 418/133 |
| 4,295,797 | 10/1981 | Ruhl et al. | 417/205 |

FOREIGN PATENT DOCUMENTS 134056 2/1933 Austria ................ 418/108

*Primary Examiner*—William R. Cline
*Assistant Examiner*—Jack McGlew
*Attorney, Agent, or Firm*—Barnes, Kisselle, Raisch, Choate, Whittemore & Hulbert

[57] ABSTRACT

A positive displacement fuel pump utilizing an in-line pump and armature with a flexible drive connection and spring-pressed backing plate for the pump and short cantilever mount shaft for the pump rotor.

3 Claims, 12 Drawing Figures

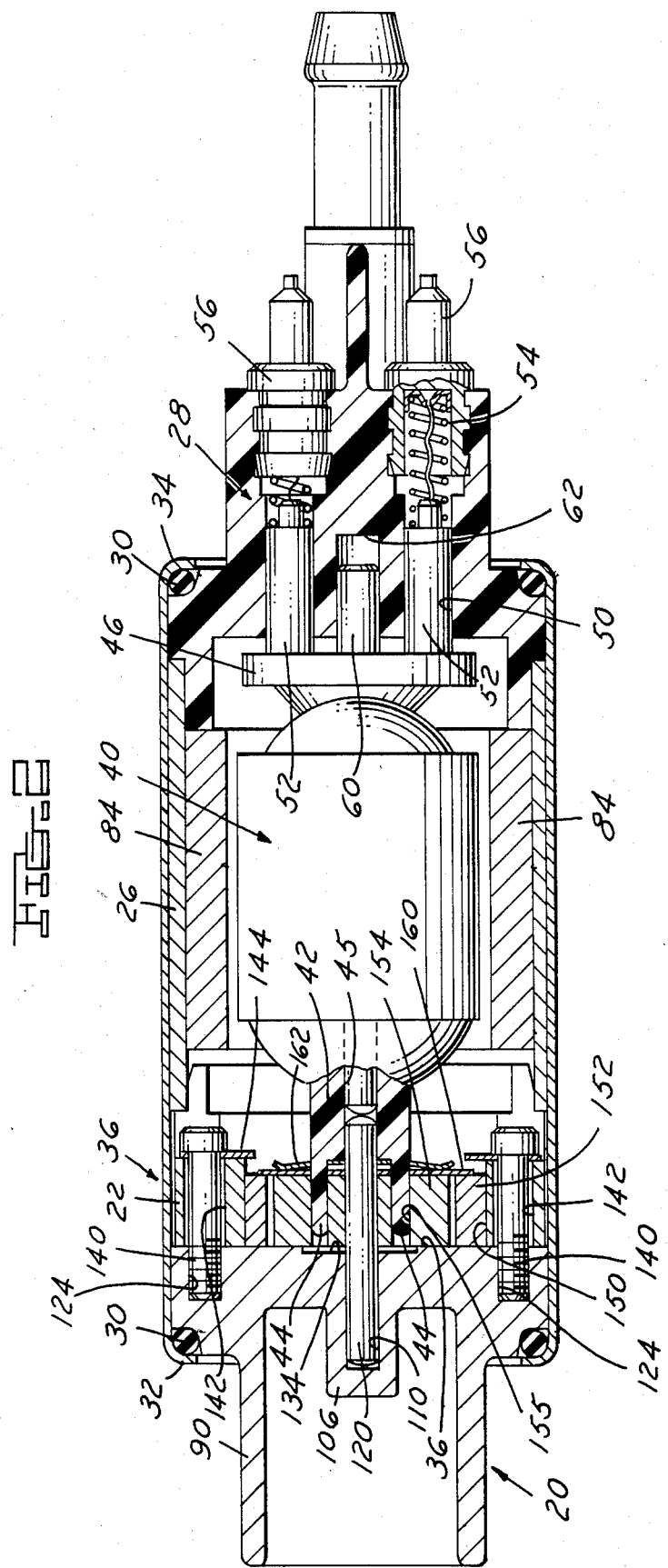

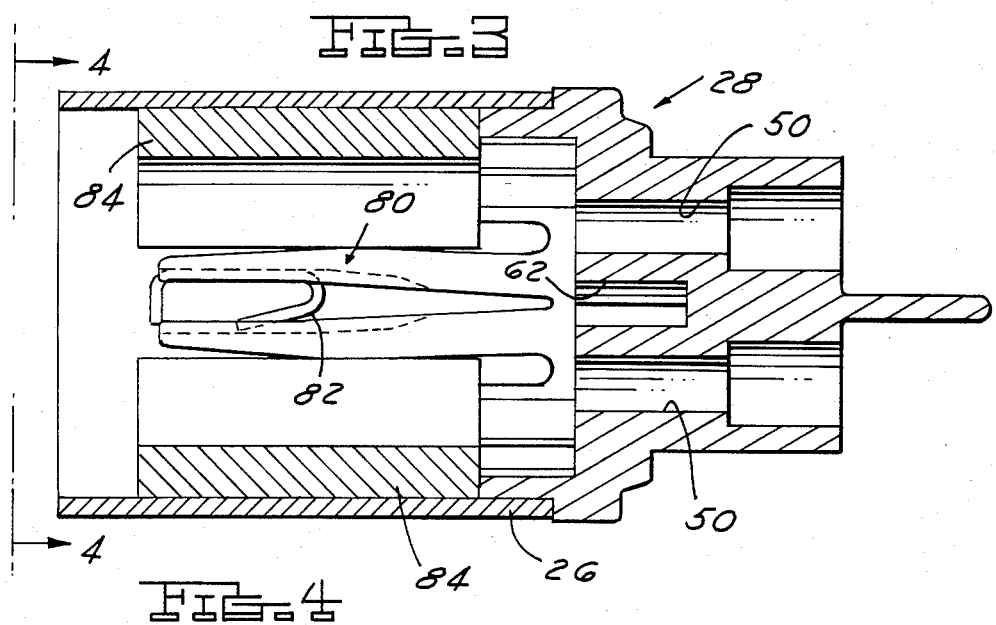
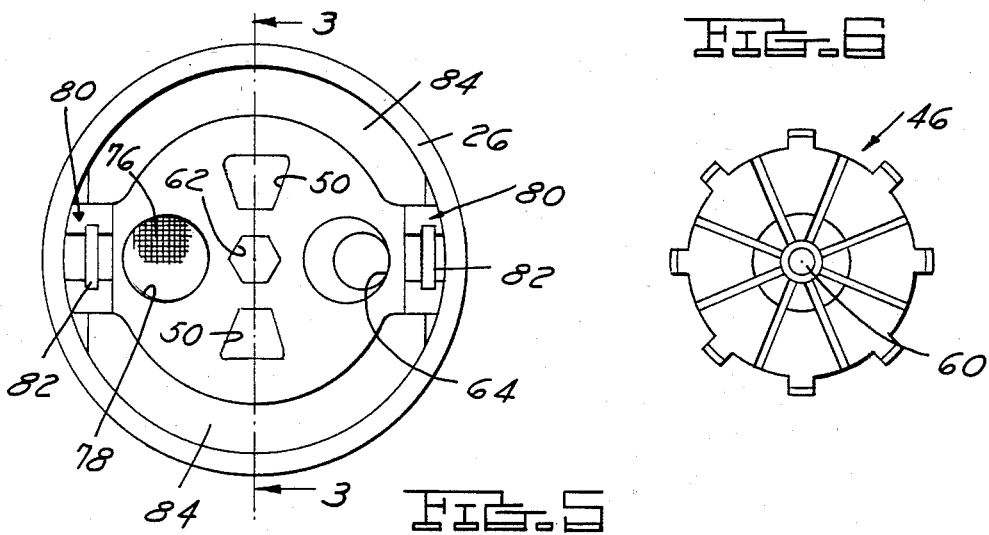
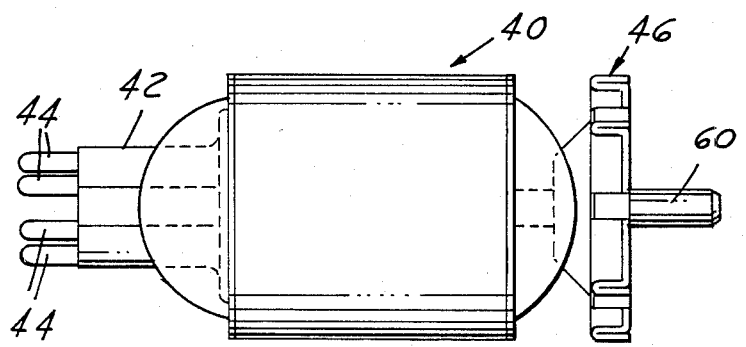

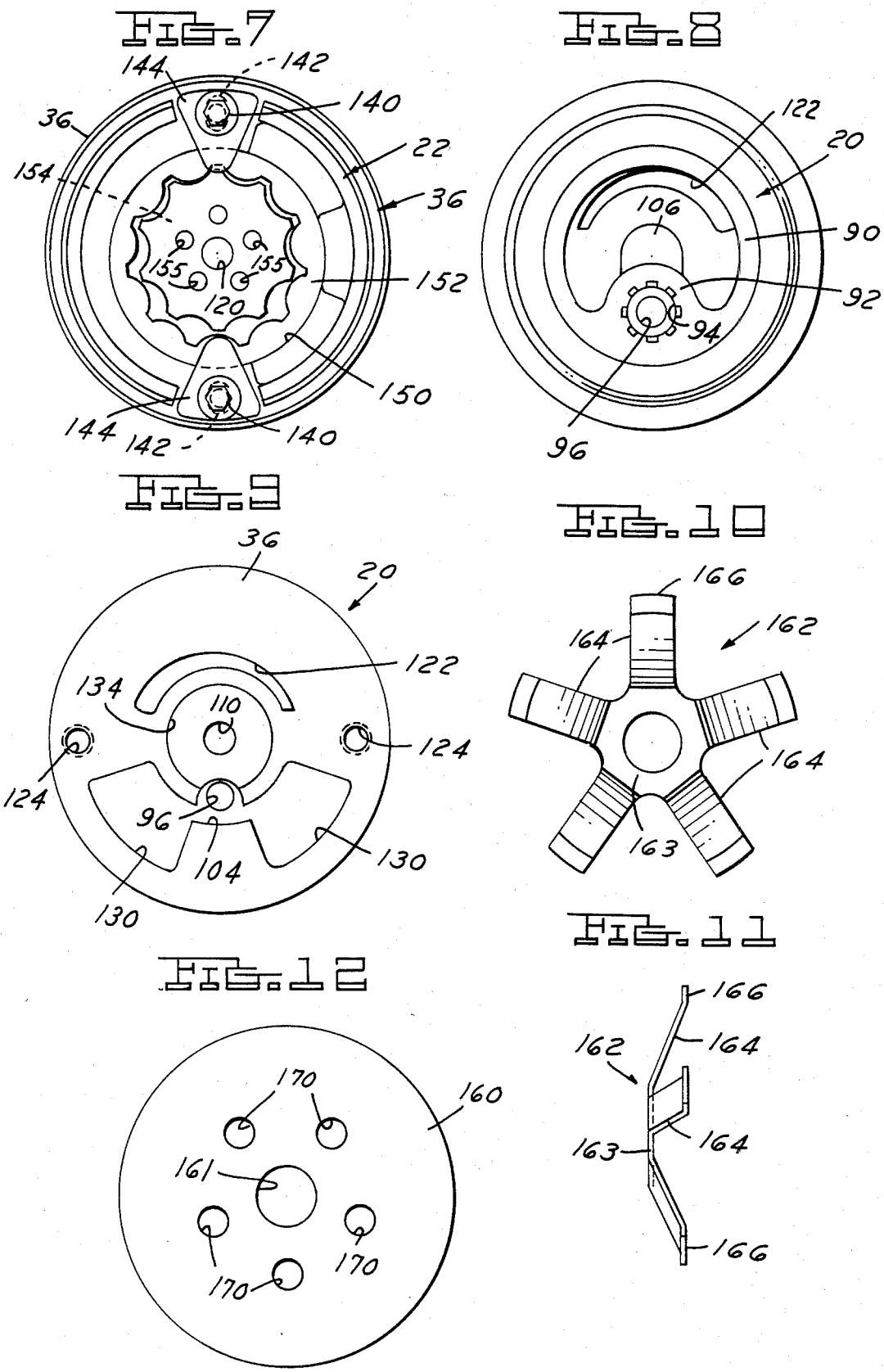

GEAR ROTOR FUEL PUMP

FIELD OF INVENTION

Electric Fuel Pumps utilizing a gear type rotor.

BACKGROUND AND FEATURES OF THE INVENTION

Many types of fuel pumps are utilized for internal combustion engines to supply fuel to the engine from a remotely positioned fuel tank. Cam-operated diaphragm pumps and positive displacement vane type pumps are in use. The significant objectives of a pump for automotive use are long life without the need for replacement parts or repair, adequate pressure and gallon per hour (gph) output, ability to run on a 12-volt electrical source, and a quiet operation will not be disturbing to passengers in vehicles in which the pump is used.

Pumps utilizing a gear type rotor are known. The present invention has the objectives of meeting the above requirements in a construction in which manufacturing cost is minimized and performance is optimized. It is a further object to provide a construction which compensates for misalignment in assembly without affecting pump operation. Another object is the provision of a construction which avoids expensive machining and critical assembly dimensions.

Objects and features of the present invention will be apparent in the following description and claims in which the the invention is described, together with a disclosure directed to persons skilled in the art to enable the making and using of the invention, all in connection with the best mode presently contemplated for the practice of the invention.

BRIEF DESCRIPTION OF THE DRAWINGS

Drawings accompany the disclosure and the various views thereof may be briefly described as:

FIG. 2, a second longitudinal section of a pump assembly taken at 90° to the first longitudinal section.

FIG. 3, a sectional view of an outlet cover and motor housings taken on line 3—3 of FIG. 4.

FIG. 4, an end view of the motor housing taken at line 4—4 of FIG. 3.

FIG. 5, an elevation of an armature assembly.

FIG. 6, a view of the commutator end of the armature.

FIG. 7, an interior view of the inlet end of the pump and the pump assembly.

FIG. 8, a view of the pump inlet end from the outside.

FIG. 9, a view of the pump inlet end from the inside without the pump elements.

FIG. 10, an elevation of a spring.

FIG. 11, a side view of the spring retainer.

FIG. 12, an elevation view of the gear pump seal plate.

DETAILED DESCRIPTION OF THE INVENTION AND THE MANNER AND PROCESS OF USING IT

Figure 1:
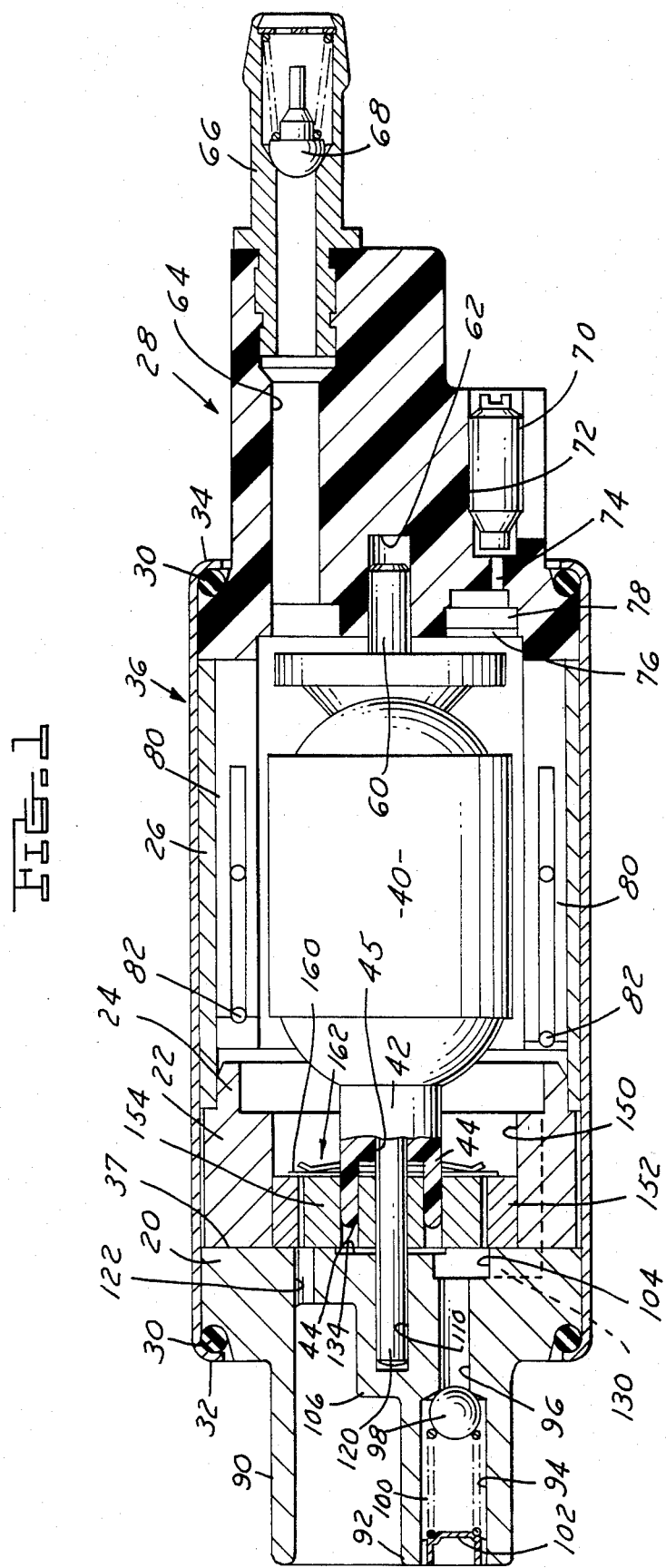
FIG. 1, a first longitudinal section of a pump assembly.

With reference first to FIG. 1, the general assembly of the rear rotor pump is shown in longitudinal section. An inlet end shell or housing 20, which can be a die casting or molded part, butts against a cam ring 22 which has a reduced flange 24 telescoping into one end of a flux ring 26. At the other end of the flux ring is an outlet end part 28. The inlet end and the outlet end each have opposed shoulders against which sealing rings 30 are disposed, held in place by spun-in ends 32, 34 of an outer metallic shell 36. The inlet housing 20 has a flat inner surface 37 which serves as one wall of a pump rotor housing.

In FIG. 5, an armature assembly 40 is illustrated having a cylindrical drive projection 42 at one end with slender projecting fingers 44 circumferentially spaced around projection 42. At the other end of assembly 40 is a commutator disc 46. In FIG. 2, brush recesses 50 contain brushes 52 backed by springs 54 seated in brush connector nipples 56 projecting from the outlet end housing.

The armature shaft 60 at the commutator end is received in a central recess 62 in the end housing. Reverting to FIG. 1, the outlet end housing 28 has an axially extending passage 64 which serves as a pump outlet in conjunction with a brass outlet fitting 66 carrying a one-way, spring-pressed outlet valve 68. This fitting is molded into the outlet housing 28 formed of a glass reinforced plastic which has a high degree of resistance to hydrocarbons, as do the other plastic parts of the assembly. A screw outlet bleed adjustment plug 70 is threaded into recess 72 in end housing 28 to control a passage 74 leading to the interior of the pump assembly. A filter disc 76 is positioned in a port 78 connecting to passage 74.

The end housing 28 has axially extending split fingers 80 carrying spreading springs 82. See FIGS. 1 and 3. These fingers hold semi-circular permanent magnets 84 which surround the armature outside of air gap and form the motor field. See FIG. 4.

The inlet end 20 of the pump at the left end of FIGS. 1 and 2 has a cylindrical entrance collar 90. Viewed from the outer end, as in FIG. 8, this collar has an internal bulge 92 toward the center. The bulge has an axial recess 94 splined on its inner surface and leads to a passage 96 ensmalled to form a valve seat for a ball valve 98 backed by a spring 100 retained by a press-fit button 102. Passage 96 communicates with a pump outlet passage 104 so that the ball valve may serve as a relief valve.

Inwardly of the collar 90, and rising from bulge 92, is a further bulge 106 integral with the end housing which has a central recess 110 to receive a pump rotor mount in the form of a stub shaft 120. A view of the inside of the inlet end 20 is found in FIG. 9. Outside the pin recess 110 is an arcuate inlet port 122 open, as shown in FIG. 1, to the interior of inlet collar 90. Two diametrically opposed threaded holes 124 are formed on the inner face of housing 20. On the opposite side of center from the arcuate inlet opening are two outlet ports 130 connected by previously referenced short passage 104. Relief valve passage 96 described in connection with FIG. 1 shows also in FIG. 9. A shallow circular recess 134 surrounds pin shaft recess 110.

Cam ring 22, previously identified in FIGS. 1 and 2, has partial ring portions 24 which interfit with flux ring 26. This cam ring also has openings for headed retainer screws 140. These screw openings 142 are preferably larger than the screws to allow diametrical adjustment of the cam ring relative to the axis of the assembly. FIG. 7 shows cam ring 22. Triangular washer plates 144 underlie the heads of bolts 140 to apply retention pressure on the cam ring and hold it securely against the end housing 20. These plates also retain the outer gear rotor during assembly.

The cam ring 22 has a large circular opening 150 which is positioned off center from the basic axis of rotation and this opening receives the outer gear rotor 152 of a gear rotor pump. This particular outer gear rotor has, as an example, eleven tooth recesses. The inner gear 154 of the gear rotor assembly is mounted on stub shaft 120 and has ten gear teeth formed thereon. The gear 154 has axial holes 155 spaced around the center shaft pin 120 to receive the finger projections 44 on drive projection 42. Some small clearance is provided between the finger projections 44 and the holes 155 in rotor 154 to provide for slight misalignment.

Pressed against the gear rotor assembly is a circular flat plate 160 preferably formed of flexible material. This plate is most effective if it is flexible. A thickness range of 0.005 to 0.010", depending upon material used, has proved satisfactory. The material from which the plate 160 is formed is preferably metal and more particularly stainless steel but some dense plastics may perform successfully. The circular plate is held firmly against and rotates with the rotor assembly, thereby forming a good seal and eliminating any axial clearance and at the same time causing very little friction. Behind this plate 160 is a multi-legged spider spring 162 (FIGS. 10 and 11) having five legs 164 bent, as shown in FIG. 11, in an axial direction from a center ring portion 163. The ends of the legs 164 are bent into a plane substantially parallel to the body portion 163 to form pressure pads 166. As shown in FIGS. 1 and 2, the legs of the star or spider spring 162 interfit with the projections 44 and are pressed against the plate 160 when the parts are brought into assembly. There is a slight clearance between the diameter of the stub shaft pin and the inside diameter of the plastic drive sleeve 42 to allow some angularity to exist between the armature shaft and stationary rotor pin to prevent binding if there is slight misalignment.

The shaft pin 120 is placed in recess 110 perpendicular to the surface 37 of the end housing against which the outer gear rotor 152 and the inner gear rotor 154 are pressed by the spider spring 162. Thus, in essence, there is a cantilever mount on shaft 120 for the inner gear rotor 154. The outer gear rotor 152 is supported by and rotatable in the cam ring 22.

The cylindrical drive projection 42, previously referenced as mounted on the armature assembly, has a central bore 45 which receives and is supported on the distal end of the stub shaft 120. There is some diametrical clearance between the bore 45 and the shaft 120 so that the drive projection 42 is rotatably piloted on the shaft but allows some play. This, coupled with the clearance between drive pins 44 and drive holes in rotor 154, compensate for any misaligment of the armature assembly relative to the stub shaft. As previously indicated, some clearance is provided between the drive fingers 44 and the holes 155 to allow for any slight misalignment. The seal plate 160, which may be made of a thin non-corrosive metal or a dense plastic, is sufficiently flexible that it will provide an adequate seal on the parts and this avoids the necessity for a very accurately machined and positioned housing plate at this side of the rotor. It also eliminates difficult tolerances on the cam ring 22 and gear rotors. The operating clearance needed between rigid parts is also eliminated and this reduces leakage and cost of manufacturing.

The seal plate 160 is illustrated in elevation in FIG. 12. This plate has a central opening 161 to accommodate the shaft 120 surrounded by openings 170 to accommodate the finger projections 44.

In operation, fluid supply through collar 90 enters the inlet port 122 and moves into gear recesses between the inner and outer gear rotors 152 and 154. As gear rotor parts 152 and 154 rotate, driven by the armature 40, the drive element 42, and fingers 44, liquid is placed under a pressure as the teeth of the rotor 154 move into the gear recesses of the gear rotor 152. Fluid, such as gasoline, is forced into the outlet ports 130 (FIGS. 1 and 9) and passes around the outer gear rotor 152 into the armature chamber and to the outlet housing port 64.

There is some outside clearance between cam ring 22 and shell 36 so the ring can be shifted relative to the headed screws 140 before they are tightened. There must be some clearance between the teeth of the inner rotor gear and those of the outer rotor gear at a point directly across from the area where the teeth are in mesh. This clearance would normally be in a range of 0.0005 to 0.003. The clearance can be adjusted by movement of the cam ring which pilots the outer rotor gear. The object is to keep the teeth tip clearance to a minimum to prevent pressurized fluid from leaking across from the pressure side to the inlet side of the pumping unit. Once this is established, the screws 140 are tightened and the parts will maintain the proper relationship.

What is claimed is:

1. In a gear rotor pump having an outer gear rotor with pumping recesses and an inner gear rotor driven within an eccentric opening in a cam ring by a rotating power input unit, that improvement in construction which comprises:
    (a) an inlet housing having a liquid inlet at one end and a flat pump housing wall at the other end and a pump inlet and outlet ports circumferentially spaced therein,
    (b) a gear assembly mounted for rotation including an inner gear rotor rotatable about a first axis and an outer gear rotor within said cam ring rotatable with said inner gear rotor, each said rotor having equal axial dimensions with one end lying against said flat housing wall,
    (c) first flexible plate means rotatable with said assembly radially overlying the other end of said inner and outer gear rotor assembly to close the pumping recesses at said other end and pressing said assembly against said wall, and
    (d) second means for rotatably driving said first flexible plate means and said inner gear rotor to cause rotation of said outer gear rotor and a consequent pumping action,
    (e) means is provided to mount said gear assembly within said cam ring comprising a non-rotating stub shaft concentric with said first axis and mounted in said inlet housing and projecting perpendicularly from said flat wall rotatably mounting said inner rotor through a central opening in said inner rotor, the stub shaft being independent of and unsupported by said power input unit and said second means,
    (f) the second means comprising a rotating means on said power unit rotatable independent of said stub shaft having a body portion exerting axial pressure against said flexible plate means and circumferentially spaced finger projections positioned outwardly of said first axis and projecting into receiving recesses in said inner gear rotor.

2. In a gear rotor pump having an outer gear rotor with pumping recesses and an inner gear rotor driven within an eccentric opening in a cam ring by a rotating power input unit, that improvement in construction which comprises:
 (a) an inlet housing having a liquid inlet at one end and a flat pump housing wall at the other end and a pump inlet and outlet ports circumferentially spaced therein,
 (b) a gear assembly mounted for rotation including an inner gear rotor rotatable about a first axis and an outer gear rotor within said cam ring rotatable with said inner gear rotor, each said rotor having equal axial dimensions with one end lying against said flat housing wall,
 (c) first flexible plate means rotatable with said assembly radially overlying the other end of said inner and outer gear rotor assembly to close the pumping recesses at said other end and pressing said assembly against said wall, and
 (d) second means for rotatably driving said first flexible plate means and said inner gear rotor to cause rotation of said outer gear rotor and a consequent pumping action,
 (e) means is provided to mount said gear assembly within said cam ring comprising a non-rotating stub shaft concentric with said first axis and mounted in said inlet housing and projecting perpendicularly from said flat wall rotatably mounting said inner rotor through a central opening in said inner rotor, the stub shaft being independent of and unsupported by said power input unit and said second means,
 (f) the second means comprising a rotating means on said power unit having a body portion with a central bore receiving, supported by, and rotating on the distal end of said stub shaft.

3. In a gear rotor pump having an outer gear rotor with pumping recesses and an inner gear rotor driven within an eccentric opening in a cam ring by a rotating power input unit, that improvement in construction which comprises:
 (a) an inlet housing having a liquid inlet at one end and a flat pump housing wall at the other end and a pump inlet and outlet ports circumferentially spaced therein,
 (b) a gear assembly mounted for rotation including an inner gear rotor rotatable about a first axis and an outer gear rotor within said cam ring rotatable with said inner gear rotor, each said rotor having equal axial dimensions with one end lying against said flat housing wall,
 (c) first flexible plate means rotatable with said assembly radially overlying the other end of said inner and outer gear rotor assembly to close the pumping recesses at said other end and pressing said assembly against said wall, and
 (d) second means for rotatably driving said first flexible plate means and said inner gear rotor to cause rotation of said outer gear rotor and a consequent pumping action,
 (e) said cam ring having an axially extending annular flange concentric with said first axis, and said rotating power input unit comprising a motor coaxial with said first axis having an encircling flux ring mounted in telescoping relation with said cam ring flange, an armature to rotate on said first axis having an extension portion provided at one end provided with a shaft recess, and means for mounting said gear assembly comprising a stub shaft projecting perpendicularly from said wall and into said shaft recess on said armature.

* * * * *